United States Patent [19]

Simons

[11] 4,363,931

[45] Dec. 14, 1982

[54] SPLICE STABILIZER

[75] Inventor: Bill R. Simons, Pittsburg, Kans.

[73] Assignee: Max K. Evans, Garland, Tex.

[21] Appl. No.: 239,192

[22] Filed: Mar. 2, 1981

[51] Int. Cl.³ .................... H02G 9/00; F16L 3/00
[52] U.S. Cl. ................................ 174/135; 174/37; 248/49; 248/74 B
[58] Field of Search ............... 174/37, 38, 39, 68 R, 174/70 R, 72 R, 72 A, 84 R, 88 R, 96, 98, 135, 136; 138/105, 108; 248/49, 74 B, 74 PB; 405/154, 157, 159, 172

[56] References Cited

U.S. PATENT DOCUMENTS 3,802,654  4/1974  Jenko et al. ............... 174/72 A X

FOREIGN PATENT DOCUMENTS 238025  10/1959  Australia ............... 174/68 C

Primary Examiner—Laramie E. Askin
Attorney, Agent, or Firm—Robert E. Massa

[57] ABSTRACT

A device for stabilizing, with reference to the surrounding terrain, a cable splice enclosure having a cable splice therein, comprising a stabilizer rail positionable in a supporting position adjacent the splice enclosure, strap means for holding the splice enclosure in position against the stabilizer rail, a spacer member adjustably positionable longitudinally on the stabilizer rail for supporting a portion of cable near the splice enclosure, a cradle member adjustably positionable longitudinally on the stabilizer rail and supporting the splice enclosure, and a support leg attachable to the stabilizer rail to extend laterally from the stabilizer rail.

16 Claims, 6 Drawing Figures

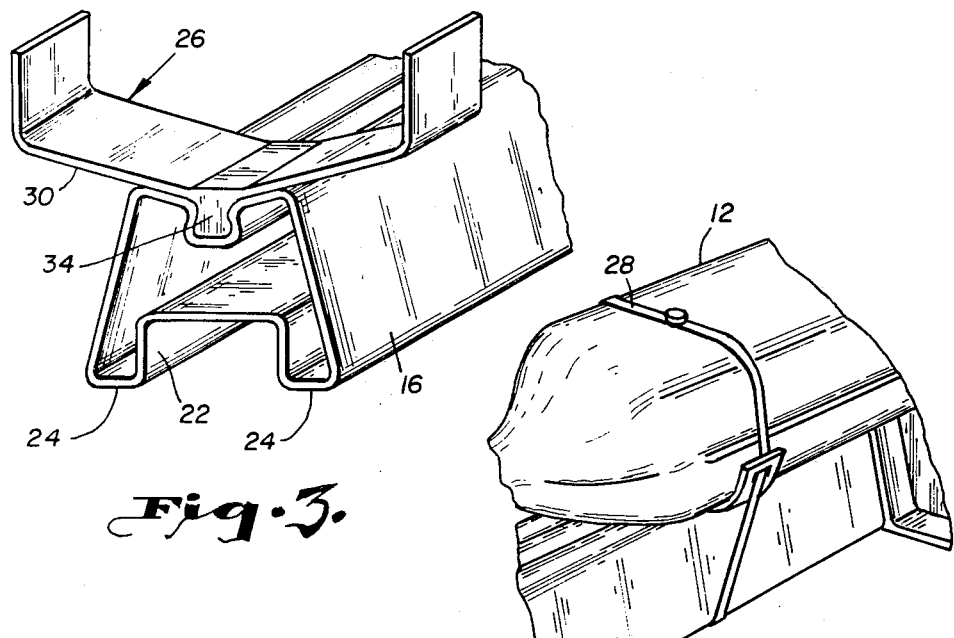
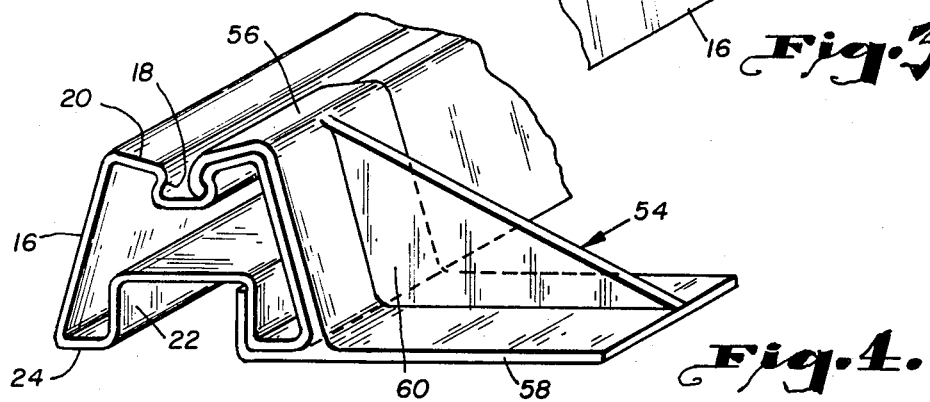
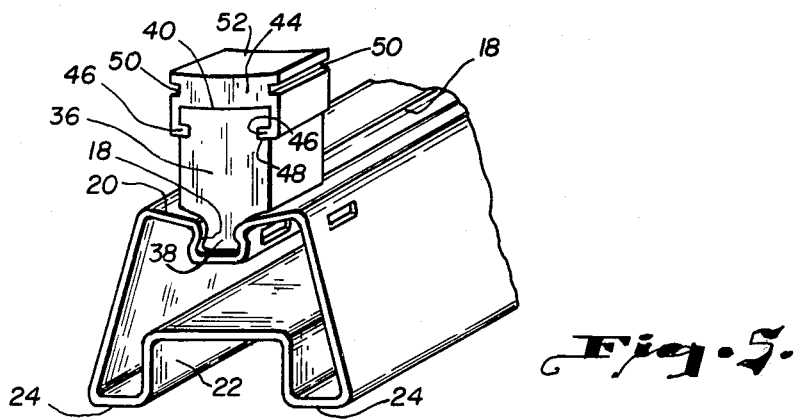

SPLICE STABILIZER

BACKGROUND OF THE INVENTION

My invention relates to a device for protecting a splice in a cable, and more particularly, to a device for protecting an underground cable splice, and still more particularly, to a device for stabilizing a cable splice enclosure having a cable splice therein with reference to the surrounding terrain.

In the prior art, devices for protecting underground cables and pipelines are known, and some of these are described in the following patents:

U.S. Pat. No. 2,306,331 to W. B. Elmer, Dec. 22, 1942
U.S. Pat. No. 3,643,005 to L. H. Mathews, Feb, 15, 1972
U.S. Pat. No. 4,069,684 to E. I. Wilson, Jan. 24, 1978.

The word "cable" normally describes two or more electrical conductors or cores which are individually insulated and contained within a protective sheath. Typically, a telephone communication cable may contain a multiplicity of conductors each individually insulated and the group contained within a metal sheath, of, for instance, lead, aluminum, or copper.

Obviously, to whatever use a cable pertains, there will eventually be need of joining one cable to a continuing cable or of splitting the original cable into smaller cables for further distribution. In any such point of joinder, the splice must be adequately protected from any potential cause of destruction, such as by movement of the surrounding earth which might cause breakage of any of the individual points of connection, breakage of many of the separate wire joints, or bending or breaking of the outer sheath permitting moisture or air to intrude. The entry of moisture or air could cause corrosion of some particular component resulting in broken connections or shortcircuiting.

Ground movement may be caused by surface traffic or by water seepage. In addition, shortly after installation of underground cable, the loosened earth has a tendency to settle further. Any of these conditions could cause the outer sheath of a cable joint to fracture.

As shown in the prior art cited above, some attempts have been made in the past to protect underground cables or other type of underground conduits by enclosing the conduit in some form of protective covering to compensate for some of the potential causes of injury to a cable.

However, I have discovered that a cable joint may best be protected from damage by enclosing the cable splice with a cable splice enclosure and securing the cable splice enclosure and adjacent portions of cable in an immobile position in relation to each other and at least stable or substantially immobile in relation to the surrounding terrain or to extended portions of the cable.

SUMMARY OF THE INVENTION

Therefore, the primary object of my invention is to provide a device for stabilizing a cable splice enclosure, with reference to the surrounding terrain, which is economical, efficient in operation, easy to manufacture, and easy to use.

Another object of my invention is to provide a device for stabilizing a cable splice enclosure, with reference to the surrounding terrain, which will reduce the chance of occurrence of a splice failure caused by environmental damage, such as: frost or ground heave, vibration, or ground settling under the splice.

Another object of this invention is to provide a device for stabilizing a cable splice enclosure, with reference to the surrounding terrain, which is readily adaptable to various types of cables, cable splices, and terrain.

Another object of this invention is to provide a device which will protect a cable splice and its surrounding encapsulant from excessive movement, thus reducing the chance of a break in the sealing component which would permit moisture to enter the cable joint area.

Another object of this invention is to provide a device which will protect either pressurized or non-pressurized type splices which employ any of the common types of splice closures in use today and constructed of either plastic, lead, aluminum, stainless steel, or the like.

Another object of this invention is to provide a device for protecting a cable splice from damage which might otherwise be caused by a person using reckless, haphazard, or improper back-filling methods when burying the splice.

These and other objects of my invention will become apparent from the accompanying drawings and description and claims which describe my invention as a device for stabilizing, with reference to the surrounding terrain, a cable splice enclosure having a cable splice therein, comprising a stabilizer rail positionable in a supporting position adjacent the splice enclosure, and strap means for holding the splice enclosure in position against the stabilizer rail. A spacer base member is provided to be adjustably positionable longitudinally on the stabilizer rail for supporting a portion of cable near the splice enclosure, and a spacer member is provided to be cooperable with the spacer base member to provide added supporting configuration between the stabilizer rail and the cable.

As can easily be seen, my device provides for proper and secure cable alignment in relation to the splice area so that the cable splice area can be held securely. The cable splice area and adjoining portions of cable are thus held securely as a unit, and if there is any ground movement, move as a unit, greatly reducing, or even eliminating the chance of breakage in the cable splice. Any movement of cable at locations farther from the splice enclosure will be minimal and exert no stress on the cable splice.

BRIEF DESCRIPTION OF THE DRAWINGS

In the accompanying drawings:

FIG. 3 is a perspective view of a portion of a stabilizer device according to my invention describing a cradle component in position along a longitudinal groove of a stabilizer rail.

FIG. 3a is a partial perspective view of a stabilizer device according to my invention describing a cable splice enclosure in position on a cradle component and strapped into position on the cradle.

FIG. 4 is a perspective view of a portion of a stabilizer device according to my invention describing a support leg component in position along a stabilizer rail.

FIG. 5 is a perspective view of a portion of a stabilizer device according to my invention describing, in greater detail, a spacer base member and spacer member in position along a stabilizer rail.

DESCRIPTION OF THE PREFERRED EMBODIMENTS

Figure 1:
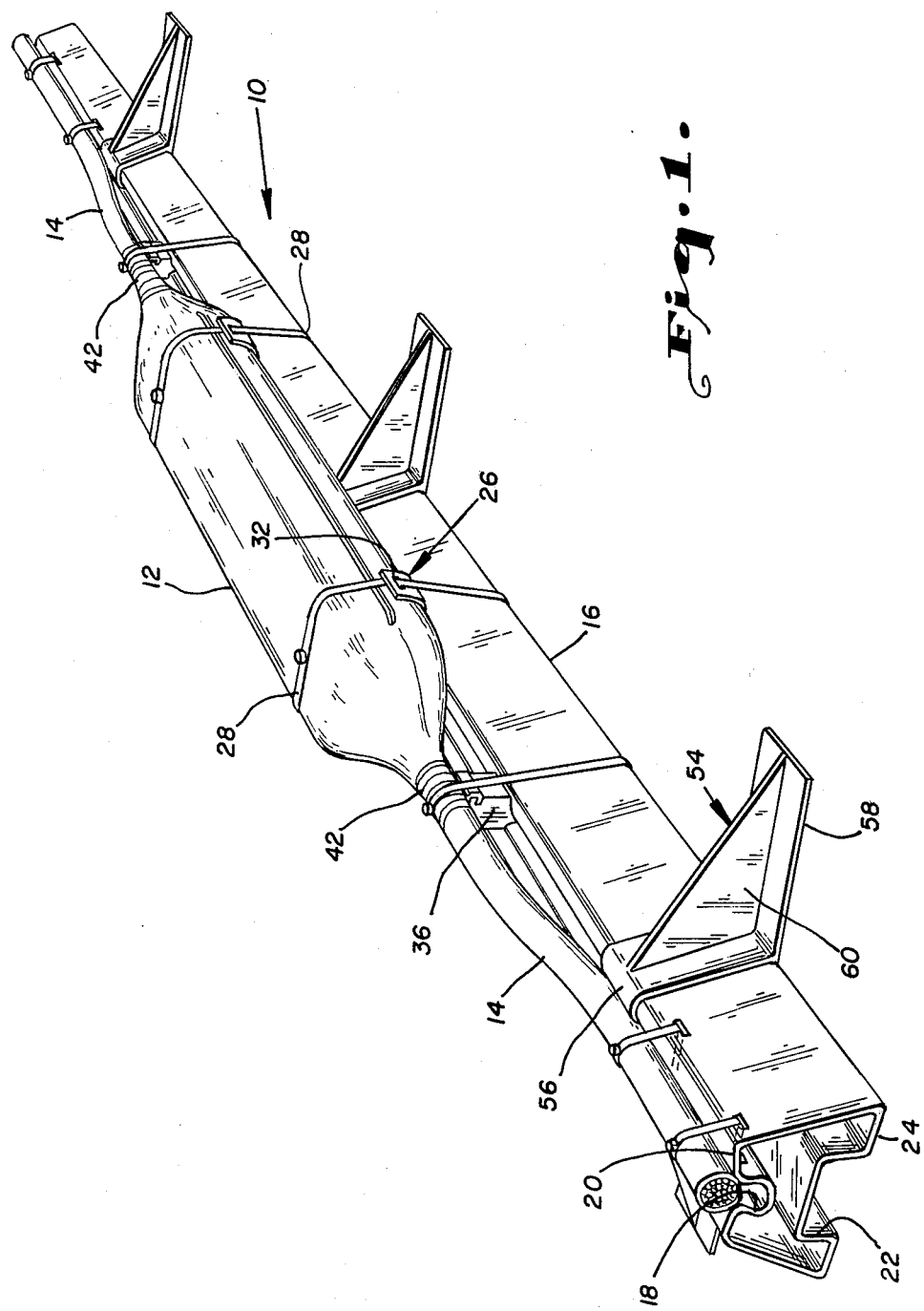
FIG. 1 is a perspective view of a stabilizer device according to my invention shown in position in relation to a cable splice enclosure and extending cable.

FIG. 1 describes a stabilizer device according to my invention, 10, generally, as it is in position with a cable splice enclosure 12 and cables 14 extending from each side of the splice enclosure 12. In normal practice, the numerous wires comprising the cables 14 are individually spliced within the splice enclosure 12 and surrounded by various types of protective material or sealant.

Figure 2:
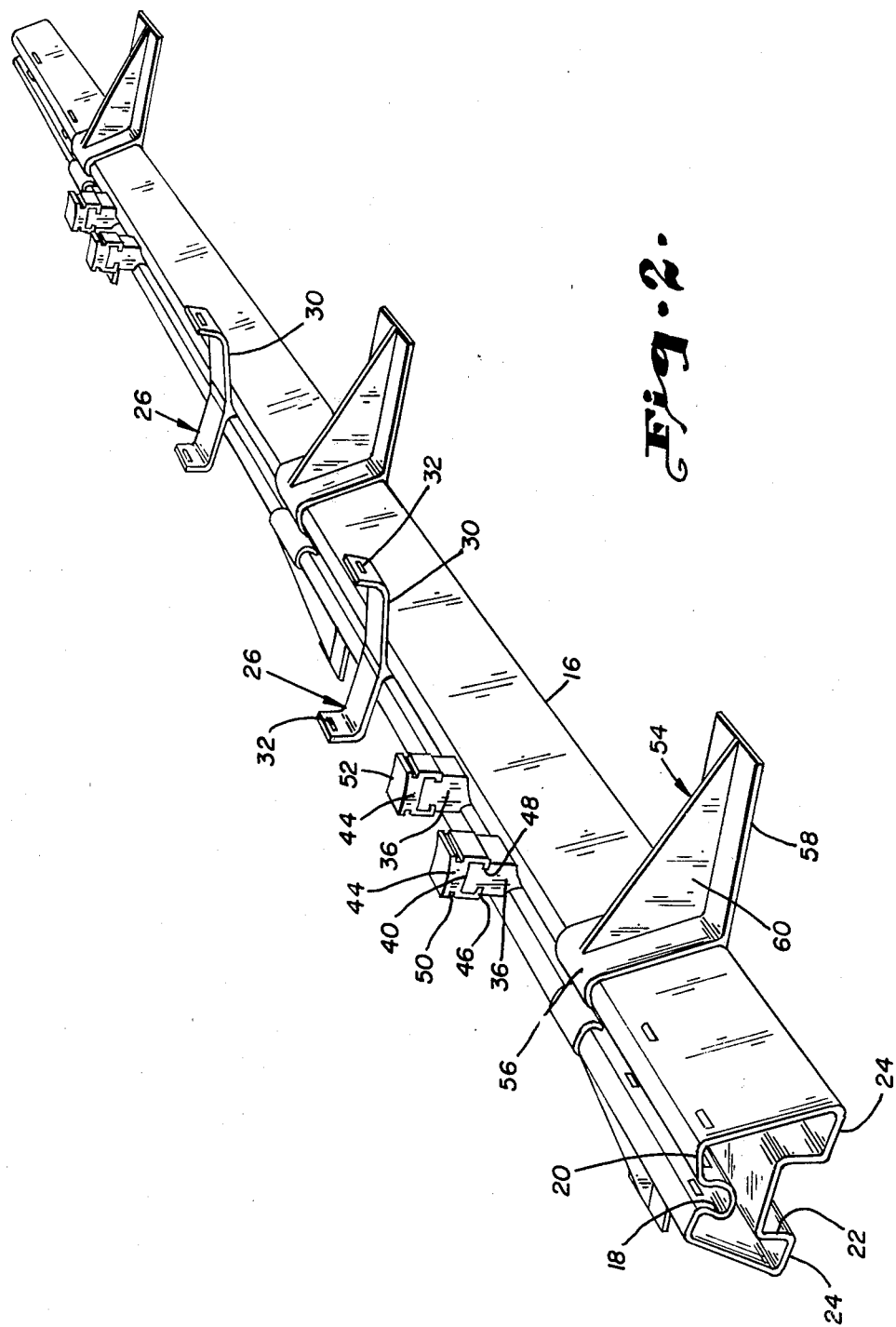
FIG. 2 is a perspective view of a stabilizer device according to my invention as it would be in position to receive a cable splice enclosure and cable.

Stabilizer device 10 comprises a stabilizer rail 16, which, as I have designed it, includes a longitudinal groove 18 along an upper surface 20 and a lower longitudinal groove 22 along a lower surface 24. A cradle member 26, generally, is shown more clearly in FIGS. 2 and 3, and is shown in position in FIG. 1 as supporting splice enclosure 12, and held in position be strap means 28. Strap means 28 may comprise any conventional type of fastening device. Cradle member 26 includes sidewardly extending arms 30, one type of which includes a slot 32 as shown in FIGS. 1 and 2, and one type of which does not include slots as shown in FIG. 3. Arms 30 may be substantially rigid to conform to the configuration of splice enclosure 12, or may be of flexible material in order to be drawn closely into conformation with splice enclosure 12. Cradle member 26 also includes means for cooperating with the longitudinal groove 18 as, for example, by member 34, so that cradle member 26 may be adjustably positionable along stabilizer rail 16 as desired. Member 34 provides means for retaining cradle member 26 securely positionable on stabilizer rail 16, particularly laterally on relation to stabilizer rail 16.

I have designed my device so that a cable splice and cable splice enclosure may be held as rigidly securable as possible both in relation to stabilizer rail 16 and to the surrounding terrain in which the entire system may be buried. To assure a more secure positioning of the splice enclosure 12 and adjacent cables 14 in relation to stabilizer rail 16, I provide a spacer base member 36 which includes a tongue 38 which cooperates with grooves 18 of the stabilizer rail 16 to permit spacer base member 36 to be adjustably positionable longitudinally on the stabilizer rail 16 to support a portion of cable 14 at the most advantageous position. As shown in the figures, spacer base member 36 includes a top surface 40 which may be conformed to fit the shape of cable 14 or extremity 42 as described. If added support is necessary for spacer base member 36 to support cable 14 or extremity 42, I have provided a spacer member 44 which will give added supporting configuration between the stabilizer rail 16 and the cable 14 or extremity 42. I have designed spacer member 44 and spacer base member 36 so that spacer member 44 includes flanges 46 which fit into grooves 48. Also, spacer member 44 includes a groove 50 into which a further flange 46 of another spacer member 44 may fit, if necessary. Then, top surface 52 of spacer member 44 is essentially in conformation with top surface 40 of spacer base member 36.

As I have shown in FIGS. 1, 2, and 4, I have provided a support leg 54, generally, which includes a hook portion 56 which provides means for cooperating with the longitudinal groove 18 in stabilizer rail 16 to clamp the support leg 54 in position against a side of the stabilizer rail. Support leg 54 extends laterally from the stabilizer rail 16 when in position, and further includes a lower planar surface 58 which may be substantially parallel to a lower surface of the stabilizer rail, and gives support for the device against the surrounding terrain in one direction, as shown. Support leg 54 also includes an upper planar surface 60 which is shown to extend at an angle to the lower planar surface 58 in order to provide support for the device against the surrounding terrain in a direction substantially at a right angle to the support provided by the lower surface 58.

As I have indicated, I may vary the number of strap means, spacer base members, spacer members, support legs, and position of each, depending upon the specific conditions for each use as required.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A device for stabilizing, with reference to the surrounding terrain, a cable splice enclosure having a cable splice therein, comprising:

a stabilizer rail adaptable to be positionable in a supporting position adjacent a splice enclosure,
 a spacer base member slidably positionable longitudinally on the stabilizer rail and adaptable to support a cable component of a cable splice enclosure, and
 strap means adaptable to hold a cable splice enclosure in position against the stabilizer rail.

2. A device for stabilizing a cable splice enclosure as described in claim 1, which includes a spacer member cooperable with the spacer base member and adaptable to provide added supporting configuration between the stabilizier rail and a cable.

3. A device for stabilizing a cable splice enclosure as described in claim 2, which includes a cradle member slidably positionable longitudinally on the stabilizer rail and adaptable to support a splice enclosure.

4. A device for stabilizing a cable splice enclosure as described in claim 3, wherein:

the stabilizer rail includes a longitudinal groove along an upper surface, and
 the cradle member includes means for cooperating with the longitudinal groove so that the cradle member may be securely positioned on the stabilizer rail.

5. A device for stabilizing a cable splice enclosure as described in claim 4, wherein:

the cradle member includes a pair of sidewardly extending arms adaptable to provide support means for a splice enclosure.

6. A device for stabilizing a cable splice enclosure as described in claim 5, which includes a support leg attachable to the stabilizer rail to extend laterally from the stabilizer rail.

7. A device for stabilizing a cable splice enclosure as described in claim 6, wherein:

the support leg include a lower planar surface for extending substantially parallel to a lower surface of the stabilizer rail.

8. A device for stabilizing a cable splice enclosure as described in claim 7, wherein:

the support leg includes an upper planar surface extending at an angle to the lower planar surface.

9. A device for stabilizing a cable splice enclosure as described in claim 8, wherein:
the support leg includes means for cooperating with the longitudinal groove in the stabilizer rail to clamp the support leg in position against a side of the stabilizer rail.

10. A device for stabilizing a cable splice enclosure as described in claim 1, which includes
a cradle member slidably positionable longitudinally on the stabilizer rail and adaptable to support a splice enclosure.

11. A device for stabilizing a cable splice enclosure as described in claim 10, wherein:
the stabilizer rail includes a longitudinal groove along an upper surface, and
the cradle means includes means for cooperating with the longitudinal groove so that the cradle member may be securely positioned on the stabilizer rail.

12. A device for stabilizing a cable splice enclosure as described in claim 11, wherein:
the cradle member includes a pair of sidewardly extending arms adaptable to provide support means for a splice enclosure.

13. A device for stabilizing a cable splice enclosure as described in claim 12, which includes
a support leg attachable to the stabilizer rail to extend laterally from the stabilizer rail.

14. A device for stabilizing a cable splice enclosure as described in claim 13, wherein:
the support leg includes a lower planar surface for extending substantially parallel to a lower surface of the stabilizer rail.

15. A device for stabilizing a cable splice enclosure as described in claim 14, wherein:
the support legs includes an upper planar surface extending at an angle to the lower planar surface.

16. A device for stabilizing a cable splice enclosure as described in claim 15, wherein:
the support leg includes means for cooperating with the longitudinal groove in the stabilizer rail to clamp the support leg in position against a side of the stabilizer rail.

* * * * *